United States Patent [19]
Spaltofski

[11] Patent Number: 5,127,636
[45] Date of Patent: Jul. 7, 1992

[54] VIBRATION DAMPING DEVICES

[75] Inventor: Ralf Spaltofski, Ludwigshafen, Fed. Rep. of Germany

[73] Assignee: Paulstra GmbH, Fed. Rep. of Germany

[21] Appl. No.: 558,499

[22] Filed: Jul. 27, 1990

[30] Foreign Application Priority Data

Jul. 28, 1989 [FR] France .................. 89 10242

[51] Int. Cl.$^5$ .................. B60G 11/62; F16F 13/00
[52] U.S. Cl. .................. 267/140.1 A; 267/140.1 R; 267/35; 248/562
[58] Field of Search .................. 267/140.1 R, 140.1 A, 267/35, 219; 248/562, 636

[56] References Cited

U.S. PATENT DOCUMENTS

| | | | |
|---|---|---|---|
| 2,380,899 | 7/1945 | Strachovsky | 267/140.1 R |
| 4,399,987 | 8/1983 | Cucelli et al. | 267/140.1 A |
| 4,607,828 | 8/1986 | Bodin et al. | 267/140.1 A |
| 4,749,173 | 6/1988 | Kanoa | 248/562 X |
| 4,770,396 | 9/1988 | Jouade | 267/140.1 A |
| 4,921,049 | 5/1990 | Kaiser et al. | 267/140.1 A |

FOREIGN PATENT DOCUMENTS

| | | |
|---|---|---|
| 2503581 | 8/1976 | Fed. Rep. of Germany . |
| 8717411 | 3/1988 | Fed. Rep. of Germany . |
| 2549558 | 7/1989 | France . |

*Primary Examiner*—Robert J. Oberleitner
*Assistant Examiner*—Peter M. Poon
*Attorney, Agent, or Firm*—Larson and Taylor

[57] ABSTRACT

A damping device is disclosed, intended to be inserted between two rigid assemblies, comprising two rigid elements (1, 2) which can be fixed respectively to the two assemblies and, mounted in parallel between these two rigid elements, on the one hand a main spring (3) and, on the other hand, a damping system comprising in series a rigid case (7) filled with a viscous liquid (L), a piston (5) ending in a rigid foot (4) and immersed in the liquid and an auxiliary spring ($9_1$, $9_2$). The case (7) is independent of the main spring (3), the auxiliary spring (9) is inserted between the case and the rigid element (2) to which this case is connected and the foot (4) is connected to the edge of an orifice of the case, which it passes through, by a sealed and deformable bellows (8). The case is partially defined by a sealed and flexible membrane (10) with limited movements.

10 Claims, 2 Drawing Sheets

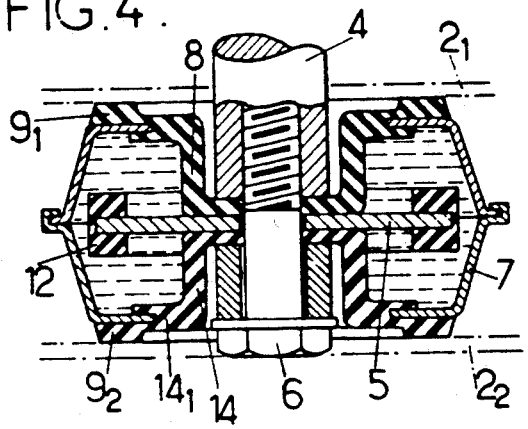
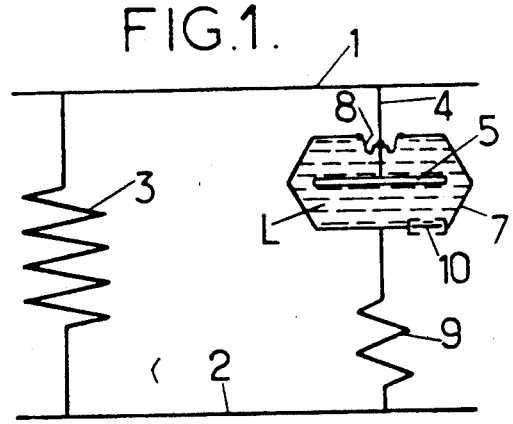
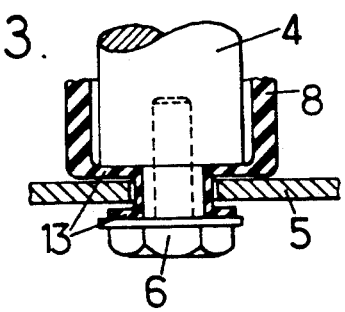
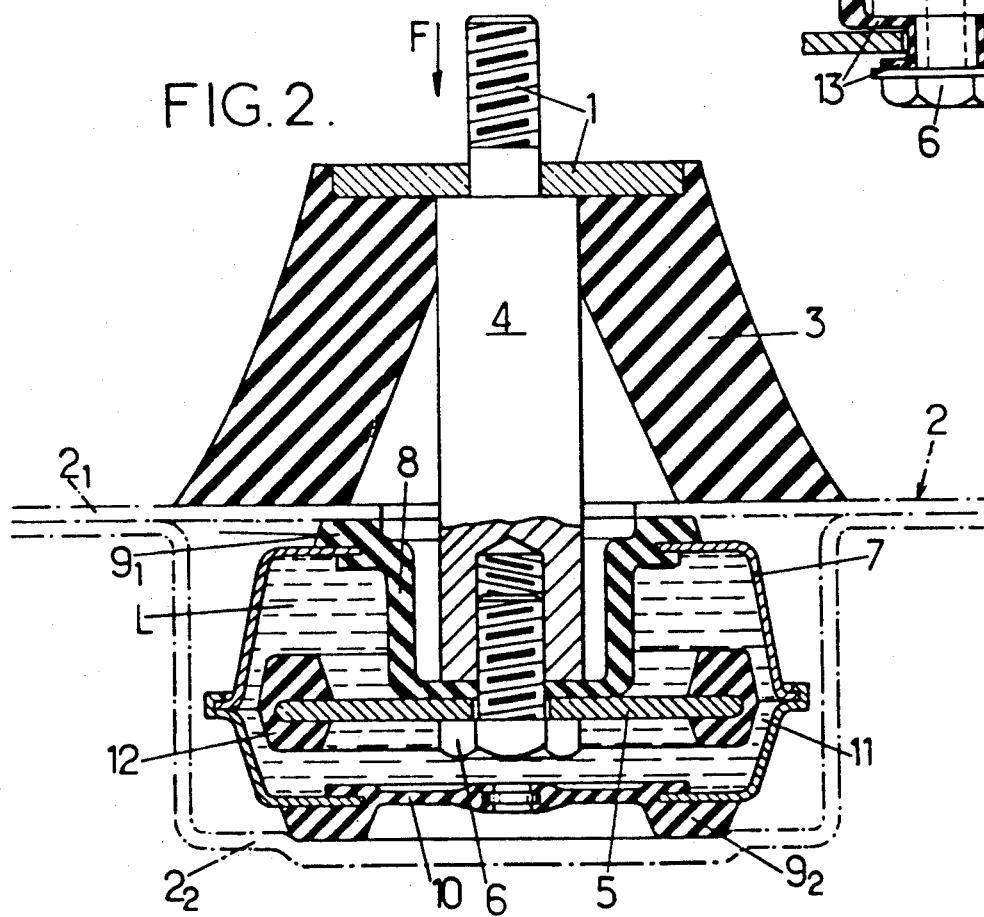

VIBRATION DAMPING DEVICES

BACKGROUND OF THE INVENTION

The invention relates to devices to be inserted for support and guide purposes between two rigid assemblies and adapted for damping the transmission of vibrations from one of these assemblies to the other.

The preferred, but not exclusive, application of such devices is for mounting internal combustion engines of vehicles on their chassis.

The invention relates more particularly, among the devices considered, to those which comprise two rigid elements which can be fixed respectively to the two assemblies and, mounted in parallel between these two rigid elements a main spring and a damping system comprising in series a rigid case filled with a viscous liquid, a piston ending in a rigid foot and immersed in the liquid and an auxiliary spring.

In embodiments which have been proposed for damping devices of the kind in question, for example in the patent FRANCE no. 2 549 558, the auxiliary spring is disposed between the piston and the foot which carries it.

These devices give satisfaction in numerous instances.

SUMMARY OF THE INVENTION

The purpose of the invention is to further improve them, in particular from the efficiency point of view, and more especially from the acoustic filtering and lifespan points of view.

For this, the damping device of the kind in question is essentially characterized according to the invention in that the case is independent of the main spring, in that the auxiliary spring is inserted between the case and the rigid element to which this case is connected and in that the foot is connected to the edge of an orifice of the case, which it passes through, by a sealed and deformable bellows.

In preferred embodiments, recourse is further had to one and/or other of the following arrangements:
- a portion of the wall defining the case is formed by a sealed and deformable membrane associated with means for limiting the amplitude of the vibratory movements of its most mobile portion to 1 mm, in a direction perpendicular to the mean surface of this portion,
- the wall of the case opposite that through which the foot passes is formed with a second orifice and the edge of this orifice is connected to the piston by a second sealed and deformable bellows,
- the two above bellows are formed by two elastomer pots whose bottoms are sealingly fixed to the end of the foot carrying the piston and whose edges are extended by external flanges themselves sealingly connected to the edges of the orifices of the case,
- the two pots according to the preceding paragraph are integrally moulded with pads extending along closed lines forming the auxiliary spring,
- the two above pots are identical,
- the portion of the wall of the case which surrounds the piston is widened at the level where the median axial zone of this piston is located at rest and narrows on each side away from this level in the direction of the movements of the piston,
- the device according to the preceding paragraph is of revolution about an axis and the portion of the annular side wall of the case, which surrounds the piston, has the form of two truncated cones juxtaposed head to tail by their large bases,
- the piston is a disc mounted axially floating on the rigid foot,
- the auxiliary spring is essentially formed by an elastomer material washer working under shearing.

Apart from these main arrangements, the invention comprises certain other arrangements which are preferably used at the same time and which will be more explicitly discussed hereafter.

BRIEF DESCRIPTION OF DRAWINGS

In what follows, some preferred embodiments of the invention will be described with reference to the accompanying drawings in a way which is of course in no wise limitative.

FIG. 1, of these drawings, shows very schematically a vibration damping device constructed in accordance with the invention, FIG. 2 shows such a damper in axial section, FIGS. 3 and 4 also show in axial section details of variants of such a damper again constructed in accordance with the invention.

DETAILED DESCRIPTION OF THE PREFERRED EMBODIMENTS

Figure 5:
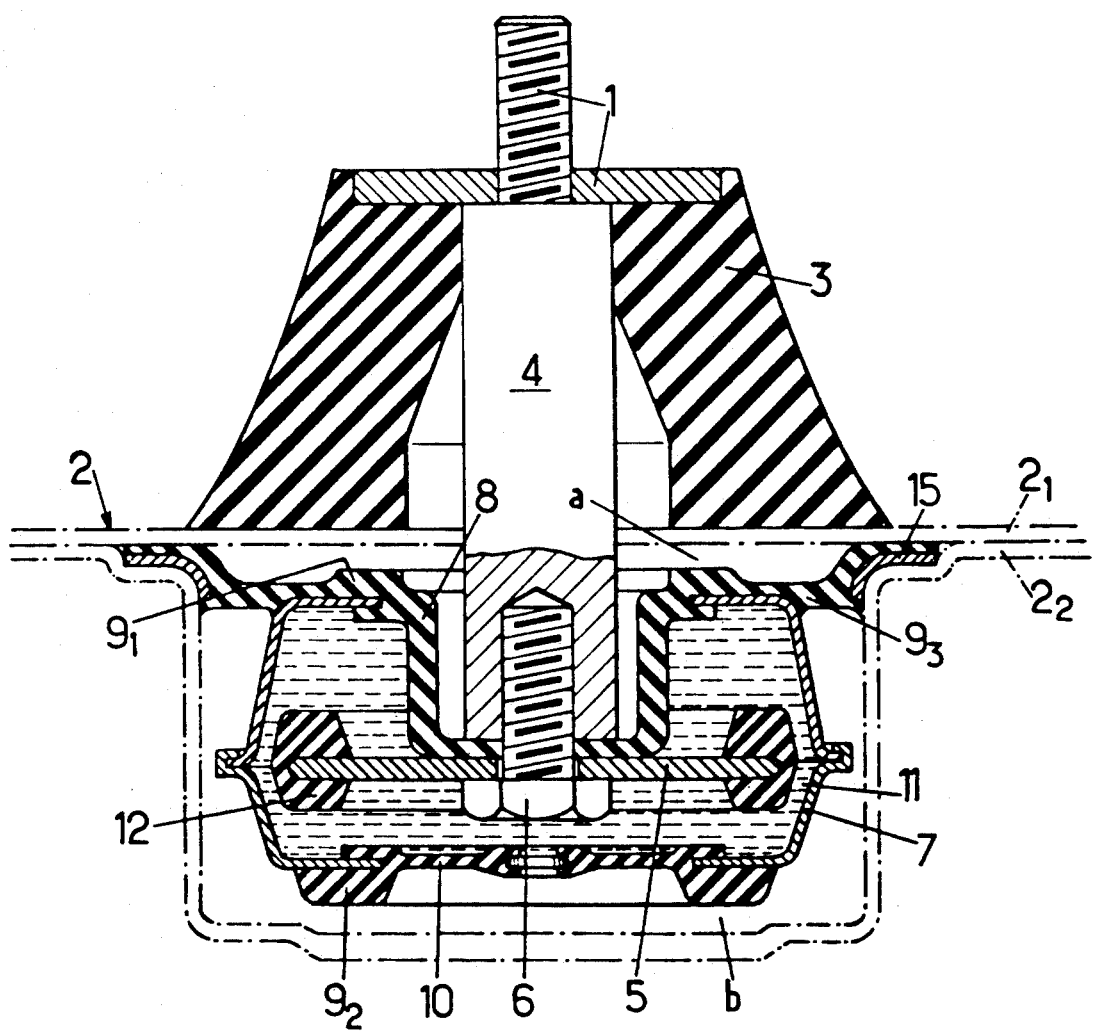
FIG. 5 shows again in axial section another damper variant in accordance with the invention.

The dampers considered here by way of example are intended to be inserted between the chassis of a vehicle and the internal combustion engine of this vehicle, for supporting the engine by the chassis and damping and/or filtering out oscillations and vibrations likely to be transmitted between these two assemblies.

In a way known per se, such a damper comprises:
- two rigid elements 1, 2 able to be fixed rigidly to the two assemblies to be connected together, namely respectively to the supported mass (engine) and to the support (chassis),
- a frustroconical or cylindrical spring 3 with vertical axis made from an elastomer material, offering good axial compression resistance and inserted directly between the two elements 1 and 2,
- a foot or rigid rod 4 fixed to the upper element 1, passing axially through the spring 3 from one side to the other and projecting at the bottom below this spring,
- a disc or rigid piston 5 screwed at the lower end of foot 4 by a screw 6,
- a case or "capsule" 7 with rigid wall connected to the lower element 2, enveloping disc 5 with a clearance,
- and a damping liquid L filling the inside of capsule 7.

In addition, and in accordance with the invention, recourse is had at least to the set of following arrangements:
- capsule 7 is independent of spring 3,
- capsule 7 is connected to the lower element 2 via a second annular spring 9,
- foot 4 is connected to the edge of an orifice of capsule 7, which it passes through, by a sealed and deformable bellows 8 only opposing slight resistance to deformation.

Furthermore, preferably, a portion of the wall of capsule 7 is formed by a flat deformable membrane 10 whose periphery is sealingly connected to the rest of said wall, means being provided for limiting the amplitude of the movements of this membrane in a direction perpendicular to its mean plane to a value at most equal to 1 mm.

In the embodiment shown in FIG. 2, the auxiliary spring 9 is formed by two elastomer material rings $9_1$ and $9_2$:

the first of these rings $9_1$ is inserted vertically between the top of capsule 7 and a piece of metal sheet $2_1$ forming element 2 and on which the above spring 3 rests, as for the other ring $9_2$, it is inserted vertically between the bottom of capsule 7 and another piece of metal sheet $2_2$ forming a cup and fixed to the other one $2_1$ by welding.

As can be seen in FIG. 2, the upper ring $9_1$ is advantageously moulded integrally with bellows 8 and the lower ring $9_2$ is advantageously moulded integrally with membrane 10.

In this embodiment, in fact, said membrane 10 is formed by a circular rubber disc closing a circular hole formed in the bottom of capsule 7 coaxially to the assembly.

The means for limiting the movements of this membrane 10 may, in a way known per se, be formed of rigid grids disposed on each side of said membrane and fixed to the capsule 7.

In the embodiment illustrated, it is assumed that these means were formed by an inextensible cloth (not shown) incorporated in the membrane.

The operation of the above described damping device is the following.

Any downward force exerted on the supported element 1 with respect to the supporting element 2, i.e. in the direction of arrow F in FIG. 2, from the rest position illustrated in this figure, results in resilient crushing of springs 3 and $9_2$ and a downward movement of disc 5 inside the liquid mass L occupying capsule 7.

The resilient crushing mentioned generates a return force whereas the resistance opposed to the movement of the disc, or "piston" 5, by the liquid L, which resistance results in a relative upward flow of the liquid through the restricted annular passage 11 formed between piston 5 and the wall of capsule 7 which surrounds it, results in greatly damping this movement.

During the subsequent return, return of piston 5 to its initial position results in driving liquid L in the direction opposite the preceding one, i.e. downwards through the restricted passage 11.

This half cycle is followed by another half cycle in the opposite direction after the piston has gone beyond its neutral position corresponding to the rest position and so on.

Experience shows that recourse to the above described arrangements confers excellent qualities on the damper obtained, in particular in so far as the acoustic filtering and lifespan are concerned.

It may be thought that this excellent result is due to the fact:

that location of the auxiliary spring 9 between capsule 7 and the rigid element 2 fixed to the support rather than between disc 5 and the foot 4 which carries it, which foot is fixed to the supported mass, localizes the essential part of the action due to this spring between the vibrating liquid mass L and the support element 2 rather than between the supported element 1 and said liquid mass, which would have reduced the magnitude of the vibration of this liquid mass and so the damping obtained thereby, and that the presence of the membrane, if one is provided, absorbs the instantaneous overpressures likely to arise in the damping liquid during operation of the device.

Examination of FIG. 2 reveals other arrangements than those more specially described above.

In particular, the rigid capsule 7 is defined by two cups hollowed out in the form of truncated cones and connected together head to tail at the level of their large bases.

This level is that N where the median axial zone of disc 5 is located at rest.

In other words, the cross section which is available for the flow of liquid L about this disc is maximum when the latter is in the vicinity of its rest position and decreases on the other hand when this disc moves away from said position.

Thus, automatic adjustment of the stiffness of the device is obtained since, the greater the amplitude of the axial movements imparted to disc 5 inside liquid L, the greater is the resistance opposed by this liquid to the movements of this disc, considering the corresponding reduction of the flow section of the restricted passage 11 offered to said liquid.

Other constructions could be adopted without departing from the scope of the invention for automatically reducing the flow section of the restricted passage offered to liquid L between disc 5 and capsule 7 which surrounds it when the amplitude of the relative axial movement of this disc increases with respect to this capsule.

In particular, the wall of capsule 7 could be cylindrical and formed with vertically elongate grooves whose horizontal cross section is all the greater the nearer the point considered of the groove to the above defined level N.

It can be further seen in FIG. 2 that disc 5 is surrounded by an elastomer material pad 12 which has several advantages:

the presence of this pad increases the axial dimension of the restricted passage 11, it damps the shocks which might be due to the direct contact between the edge of disc 5 and the facing portion of the wall of capsule 7.

As can be seen in FIG. 2, the faces of pad 12, which are situated transversely opposite the wall of capsule 7, are advantageously given orientations substantially parallel to this wall when piston 5 is in its rest position illustrated.

In other words, the cross section of the restricted passage 11 is substantially the same over the whole length of this passage for said rest position of piston 5.

FIG. 3 shows a variant in which disc 5, instead of being screwed rigidly against the end of foot 4, is mounted so as to float axially on the base of this foot.

Elastomer material rings 13 are then inserted between the facing faces of disc 5 and its support so as to suppress the noises due to the mutual shocks between the metal parts.

These rings 13 may be fixed to one and/or other of the parts concerned and may be formed by a portion of bellows 8 as illustrated.

In a variant illustrated in FIG. 4, the above flat membrane 10 is replaced by a membrane 14 in the form of an upturned pot whose bottom is fixed sealingly on the base of foot 4 by screw 6 and whose edge is extended by an external flange $14_1$ fixed sealingly, like the edge of the preceding flat membrane 10, against the edge of an opening formed in the bottom of capsule 7: it is then this edge $14_1$ which is extended by the above ring $9_2$.

In this variant, bellows 8 may be formed by a pot quite identical to pot 14, which leads to a symmetrical construction and greatly simplifies manufacture.

In another variant illustrated in FIG. 5, the auxiliary spring is no longer formed, as in the preceding embodiments, by two annular pads $9_1$ and $9_2$ working under compression and inserted axially between case 7 and metal sheets $2_1$, $2_2$ forming the rigid element 2, which pads may have a "stepped" profile so as to obtain a non linear response of damping as a function of the amplitudes of the oscillations to be damped.

Here, case 7 is separated axially from the two metal sheets $2_1$ and $2_2$ by gaps a and b and it is connected to the rigid element 2 by an elastomer material washer $9_3$ of low stiffness working under shearing and flexion.

Pads $9_1$ and $9_2$ are again provided here, but they serve solely for making the ends of travel abutment of the movements of the case progressive with respect to the piston 2.

Washer $9_3$ may be inserted between the median axial zone, of maximum diameter, of case 7 and a cylindrical facing wall which surrounds it, forming part of the rigid element 2.

In the embodiment illustrated, this washer $9_3$ is integrally moulded with bellows 8 and ring $9_1$ and extends the latter outwardly, its peripheral edge being crimped between two facing zones respectively of the two metal sheets $2_1$ and $2_2$, deformed or not, forming the rigid element 2, with possibly insertion of a metal collar 15 fixed against said edge.

Following which, and whatever the embodiment adopted, a vibration damping device is finally obtained whose construction, operation and advantages are sufficiently clear from the foregoing.

As is evident, and as it follows already moreover from what has gone before, the invention is in no wise limited to those of its modes of application and embodiments which have been more especially considered; it embraces, on the contrary, all variants thereof.

We claim:

1. Damping device to be inserted between two rigid assemblies, comprising two rigid elements fixed respectively to the two assemblies, a main spring and a damping system mounted in parallel so as to provide separate force transmission paths between said two rigid elements, said damping system comprising a rigid case filled with a viscous liquid, a piston ending in a rigid foot and immersed in said liquid, and an auxiliary spring, the auxiliary spring being inserted between the case and that rigid element to which the case is connected and the foot being connected to the edge of an orifice of the case, which the foot passes through, by a sealed and deformable bellows, the liquid filling the case being out of contact with said main spring.

2. Damping device according to claim 1, wherein a portion of a wall defining the case is formed by a sealed and deformable membrane associated with means for limiting the amplitude of the vibratory movements of the most mobile portion of said membrane in a direction perpendicular to the surface of said portion of said membrane.

3. Damping device according to claim 1, wherein a portion of the wall of the case opposite said orifice includes a second orifice, said second orifice being connected to the piston by a second sealed and deformable bellows.

4. Damping device according to claim 3, wherein said two bellows comprise two elastomer pots having bottoms which are sealingly fixed to the end of the foot carrying the piston and having edges which are extended by external flanges, said external flanges being sealingly connected to the edges of the orifices of the case.

5. Damping device according to claim 4, wherein said two pots are integrally moulded with pads extending along closed lines forming the auxiliary spring.

6. Damping device according to claim 4, the two pots being substantially identical.

7. Damping device according to claim 1, wherein said piston includes a medial axial zone and wherein a portion of the wall of the case which surrounds the piston is widened at a level where the median axial zone of the piston is located at rest and narrows on each side away from said level.

8. Damping device according to claim 7, wherein the portion of the wall of the case which surrounds the piston has the shape of two connected truncated cones having large bases, said cones being connected at said large bases.

9. Damping device according to claim 1, wherein the piston comprises a disc which is mounted axially and floatingly on the rigid foot.

10. Damping device according to claim 1, wherein the auxiliary spring comprises an elastomer washer.

* * * * *